(12) United States Patent
Ryu et al.

(10) Patent No.: US 11,052,726 B2
(45) Date of Patent: Jul. 6, 2021

(54) VEHICLE AIR-CONDITIONING SYSTEM

(71) Applicant: HANON SYSTEMS, Daejeon (KR)

(72) Inventors: Jae Chun Ryu, Daejeon (KR); Chui Hee Kim, Daejeon (KR); Tae Yong Park, Daejeon (KR); Yong Nam Ahn, Daejeon (KR); Young Hum Han, Daejeon (KR); Joong Man Han, Daejeon (KR); Yun Jin Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 92 days.

(21) Appl. No.: 15/739,804

(22) PCT Filed: Jan. 6, 2017

(86) PCT No.: PCT/KR2017/000203
§ 371 (c)(1),
(2) Date: Dec. 26, 2017

(87) PCT Pub. No.: WO2017/126833
PCT Pub. Date: Jul. 27, 2017

(65) Prior Publication Data
US 2018/0361824 A1    Dec. 20, 2018

(30) Foreign Application Priority Data

Jan. 18, 2016 (KR) .................. 10-2016-0005777
Jan. 18, 2016 (KR) .................. 10-2016-0005796

(51) Int. Cl.
*B60H 1/00* (2006.01)
*B60H 1/32* (2006.01)
*B60H 1/24* (2006.01)

(52) U.S. Cl.
CPC .......... *B60H 1/00871* (2013.01); *B60H 1/00* (2013.01); *B60H 1/00028* (2013.01);
(Continued)

(58) Field of Classification Search
CPC .......... B60H 1/00871; B60H 1/00028; B60H 1/00035; B60H 1/00828; B60H 1/242;
(Continued)

(56) References Cited

U.S. PATENT DOCUMENTS

| | | | | |
|---|---|---|---|---|
| 2001/0025707 A1* | 10/2001 | Onda | ................. | B60H 1/00028 165/202 |
| 2006/0144583 A1* | 7/2006 | Araki | ................. | B60H 1/00028 165/204 |
| 2008/0295992 A1* | 12/2008 | Shindoh | ............ | B60H 1/00028 165/42 |

(Continued)

FOREIGN PATENT DOCUMENTS

| | | | | |
|---|---|---|---|---|
| DE | 19645776 A1 * | 5/1997 | ......... | B60H 1/00028 |
| EP | 1426213 A2 * | 6/2004 | ......... | B60H 1/00028 |

(Continued)

OTHER PUBLICATIONS

"Machine Translation of DE19645776". 2019.*
(Continued)

*Primary Examiner* — Edelmira Bosques
*Assistant Examiner* — Christopher Matthew Odell
(74) *Attorney, Agent, or Firm* — Dickinson Wright PLLC

(57) ABSTRACT

The present invention relates to an air conditioning system for a vehicle in which an air-conditioning module having an air-conditioning case and a blower unit is disposed at a side of an engine room relative to a dash panel, and a distribution duct having a defrost vent, a face vent, and a floor vent is disposed in the interior of a vehicle relative to the dash panel so as to distribute cold air and hot air discharged from the air-conditioning case into the interior of the vehicle, wherein the floor vent is placed on one side of an area, in which a relatively large amount of hot air flows, in a mixing chamber of the distribution duct where cold air and hot air are mixed, i.e. a side adjacent to the dash panel.

9 Claims, 12 Drawing Sheets

(52) U.S. Cl.
CPC ..... B60H 1/00035 (2013.01); B60H 1/00828 (2013.01); B60H 1/242 (2013.01); B60H 1/243 (2013.01); B60H 1/246 (2013.01); B60H 1/32 (2013.01)

(58) Field of Classification Search
CPC .... B60H 1/243; B60H 1/246; B60H 1/00057; B60H 1/00064; B60H 1/00; B60H 1/32; B60H 2001/00121; B60H 2001/00135; B60H 2001/00178
USPC .......................................... 454/152, 159–161
See application file for complete search history.

(56) References Cited

U.S. PATENT DOCUMENTS

2015/0082820 A1* 3/2015 Takahashi ............ B60H 1/0005
62/238.7

FOREIGN PATENT DOCUMENTS

| EP | 1502783 | A2 | * | 2/2005 | ......... B60H 1/00028 |
|----|---------|----|---|--------|------------------------|
| EP | 1568523 | A1 |   | 8/2005 | |
| JP | 63-77809 | U |   | 5/1988 | |
| JP | 2000326721 | A |   | 11/2000 | |
| JP | 2006007890 | A |   | 1/2006 | |
| JP | 2015039893 | A |   | 3/2015 | |
| KR | 20060046725 | A |   | 5/2006 | |
| KR | 20110089576 | A |   | 8/2011 | |
| KR | 20140028498 | A |   | 3/2014 | |
| KR | 20140054917 | A |   | 5/2014 | |
| WO | 2013105200 | A1 |   | 7/2013 | |
| WO | 2013105201 | A1 |   | 7/2013 | |
| WO | 2013105203 | A1 |   | 7/2013 | |
| WO | WO2013105202 | A1 |   | 7/2013 | |
| WO | WO-2013182703 | A1 | * | 12/2013 | ......... B60H 1/00535 |

OTHER PUBLICATIONS

"Machine Translation of EP1502783". 2019.*
"Machine Translation of WO2013182703". 2020.*
"Machine Translation of EP1426213". 2020.*
International Search Report and Written Opinion dated Jul. 25, 2017 from International Patent Application Serial No. PCT/KR2017/000203, with English translation of International Search Report.

* cited by examiner

Prior Art

Prior Art

Prior Art

VEHICLE AIR-CONDITIONING SYSTEM

CROSS-REFERENCE TO RELATED APPLICATIONS

This application is a U.S. National Stage of International Application No. PCT/KR2017/000203, filed Jan. 6, 2017, which claims the benefit and priority of KR 10-2016-0005796 filed Jan. 18, 2016 and KR 10-2016-0005777 filed Jan. 18, 2016. The entire disclosures of each of the above applications are incorporated herein by reference.

TECHNICAL FIELD

The present invention relates to an air conditioning system for a vehicle and, more particularly, to an air conditioning system for a vehicle in which an air-conditioning module having an air-conditioning case and a blower unit is disposed at a side of an engine room relative to a dash panel, and a distribution duct having a defrost vent, a face vent, and a floor vent is disposed in the interior of a vehicle relative to the dash panel so as to distribute cold air and hot air discharged from the air-conditioning case into the interior of the vehicle, wherein the floor vent is placed on one side of an area, in which a relatively large amount of hot air flows, in a mixing chamber of the distribution duct where cold air and hot air are mixed, i.e. a side adjacent to the dash panel.

BACKGROUND ART

In general, as shown in FIG. 1, an air conditioning system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and for evaporating the refrigerant to cool the air discharged to the interior of the vehicle through heat absorption by evaporative latent heat. The compressor 1, the condenser 2, the expansion valve 3 and the evaporator 4 are connected with one another via refrigeration pipes. The air conditioning system cools the interior of the vehicle through the following refrigerant circulation process.

When a cooling switch (not shown) of the air conditioning system is turned on, first, the compressor 1 inhales and compresses vapor-phase refrigerant of low-temperature and low-pressure while driving by driving power of an engine or a motor, and then sends the refrigerant in the gaseous phase of high-temperature and high-pressure to the condenser 2. Then, the condenser 2 condenses the vapor-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the vapor-phase refrigerant is inhaled into the compressor 1, and then, recirculates the refrigeration cycle as described above.

The evaporator is mounted inside the air-conditioning case mounted to the interior of the vehicle to cool the interior of the vehicle. That is, the air blown by the blower (not shown) is cooled by evaporative latent heat of the liquid-phase refrigerant circulating inside the evaporator 4 and discharged to the interior of the vehicle in a cooled state so as to cool the interior of the vehicle.

Moreover, the interior of the vehicle is heated by a heater core (not shown), which is mounted inside the air-conditioning case, and, through which coolant of the engine circulates, or by an electric heater (not shown) mounted inside the air-conditioning case. In the meantime, the condenser 2 is mounted at the front side of the vehicle to radiate heat while exchanging heat with air.

Recently, an air conditioning system which carries out heating and cooling only using a refrigeration cycle has been developed. As shown in FIG. 2, such an air conditioning system includes: a cold air passageway 11 and a warm air passageway 12 which are partitioned to the right and the left inside one air-conditioning case 10; an evaporator 4 mounted on the cold air passageway 11 for cooling; and a condenser 2 mounted on the warm air passageway 12 for heating.

In this instance, at an outlet of the air-conditioning case 10, formed are a plurality of air outflow ports 15 for supplying air to the interior of the vehicle and a plurality of air discharge ports 16 for discharging air to the exterior of the vehicle. Furthermore, blowers 20 which are operated individually are respectively mounted at an inlet of the cold air passageway 11 and at an inlet of the warm air passageway 12. The air-conditioning case 10 and the blowers 20 in the air conditioning system are mounted inside the interior of the vehicle based on a dash panel (not shown), which partitions an engine room from the interior of the vehicle.

Therefore, in a cooling mode, cold air cooled while passing through the evaporator 4 of the cold air passageway 11 is discharged to the interior of the vehicle through the air outflow port 15 to cool the interior of the vehicle, and in this instance, warm air heated while passing through the condenser 2 of the warm air passageway 12 is discharged to the exterior of the vehicle through the air discharge port 16.

In a heating mode, warm air heated while passing through the condenser 2 of the warm air passageway 12 is discharged to the interior of the vehicle through the air outflow port 15 to heat the interior of the vehicle, and in this instance, cold air cooled while passing through the evaporator 4 of the cold air passageway 11 is discharged to the exterior of the vehicle through the air discharge port 16.

However, the conventional air conditioning system has a disadvantage in that it is difficult to secure an interior space of the vehicle because the air-conditioning case 10, which has the evaporator 4 and the condenser 2 mounted therein, and the blower (20) are mounted in the interior of the vehicle relative to the dash panel.

FIG. 3 is a sectional view showing an example of the air-conditioning case mounted in the interior of the vehicle. An evaporator 30 and a heater core 40 are mounted inside the air-conditioning case 10, and a defrost vent 51, a face vent 52 and a floor vent 53 are formed to discharge air to the interior of the vehicle.

However, the conventional air-conditioning case 10 has several disadvantages in that the air-conditioning case 10 arranged in the interior of the vehicle becomes larger in size because the floor vent 53 is formed in the air-conditioning case 10 to be far from the dash panel 60, and in that it is difficult to secure the interior space of the vehicle.

DISCLOSURE

Technical Problem

Accordingly, the present invention has been made in an effort to solve the above-mentioned problems occurring in the prior arts, and it is an object of the present invention to provide an air conditioning system for a vehicle, in which an air-conditioning module having an air-conditioning case and a blower unit is disposed at a side of an engine room relative to a dash panel, and a distribution duct having a defrost vent, a face vent, and a floor vent is disposed in the interior of a vehicle relative to the dash panel so as to distribute cold air and hot air discharged from the air-conditioning case into the interior of the vehicle, wherein the floor vent is placed on one side of an area, in which a relatively large amount of hot air flows, in a mixing chamber of the distribution duct where cold air and hot air are mixed, i.e. a side adjacent to the dash panel, thereby improving comfortability of the interior of the vehicle by discharging warmer air through the floor vent and discharging colder air through the face vent, preventing a reversal phenomenon between high and low temperatures, and reducing the size of the distribution duct and maximizing the interior space of the vehicle due to a structure that only the distribution duct is arranged in the interior of the vehicle and an arrangement structure of the floor vent.

Technical Solution

To achieve the above objects, the present invention provides an air conditioning system for a vehicle including: an air-conditioning case having a cold air passageway and a warm air passageway; and a distribution duct, which is connected with an outlet of the air-conditioning case and includes a defrost vent, a face vent, and a floor vent disposed to distribute cold air and warm air discharged from the air-conditioning case to a specific position of the interior of the vehicle according to air discharge modes, wherein the floor vent is placed on one side of an area, in which a relatively large amount of hot air flows, in a mixing chamber of the distribution duct where cold air and hot air are mixed together.

Advantageous Effects

The air conditioning system for a vehicle according to an embodiment of the present invention is configured such that the air-conditioning module having the air-conditioning case and the blower unit is disposed at a side of the engine room relative to the dash panel and the distribution duct having the defrost vent, the face vent, and the floor vent for distributing cold air and hot air discharged from the air-conditioning case into the interior of the vehicle is disposed in the interior of a vehicle relative to the dash panel, wherein the floor vent is placed on one side of an area, in which a relatively large amount of hot air flows, in a mixing chamber of the distribution duct where cold air and hot air are mixed, i.e. a side adjacent to the dash panel. Therefore, the air conditioning system according to the embodiment of the present invention can improve comfortability of the interior of the vehicle by discharging warmer air through the floor vent and discharging colder air through the face vent and prevent the reversal phenomenon between high and low temperatures.

Additionally, the air conditioning system according to the embodiment of the present invention can reduce the size of the distribution duct and maximize the interior space of the vehicle due to a structure that only the distribution duct is arranged in the interior of the vehicle and an arrangement structure of the floor vent.

MODE FOR INVENTION

Figure 1:
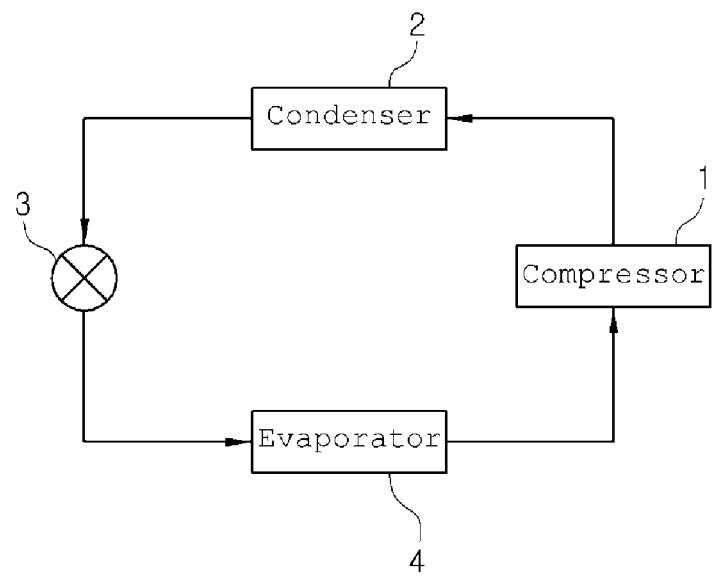
FIG. 1 is a schematic diagram showing a refrigeration cycle of a general air conditioning system for a vehicle.
Figure 2:
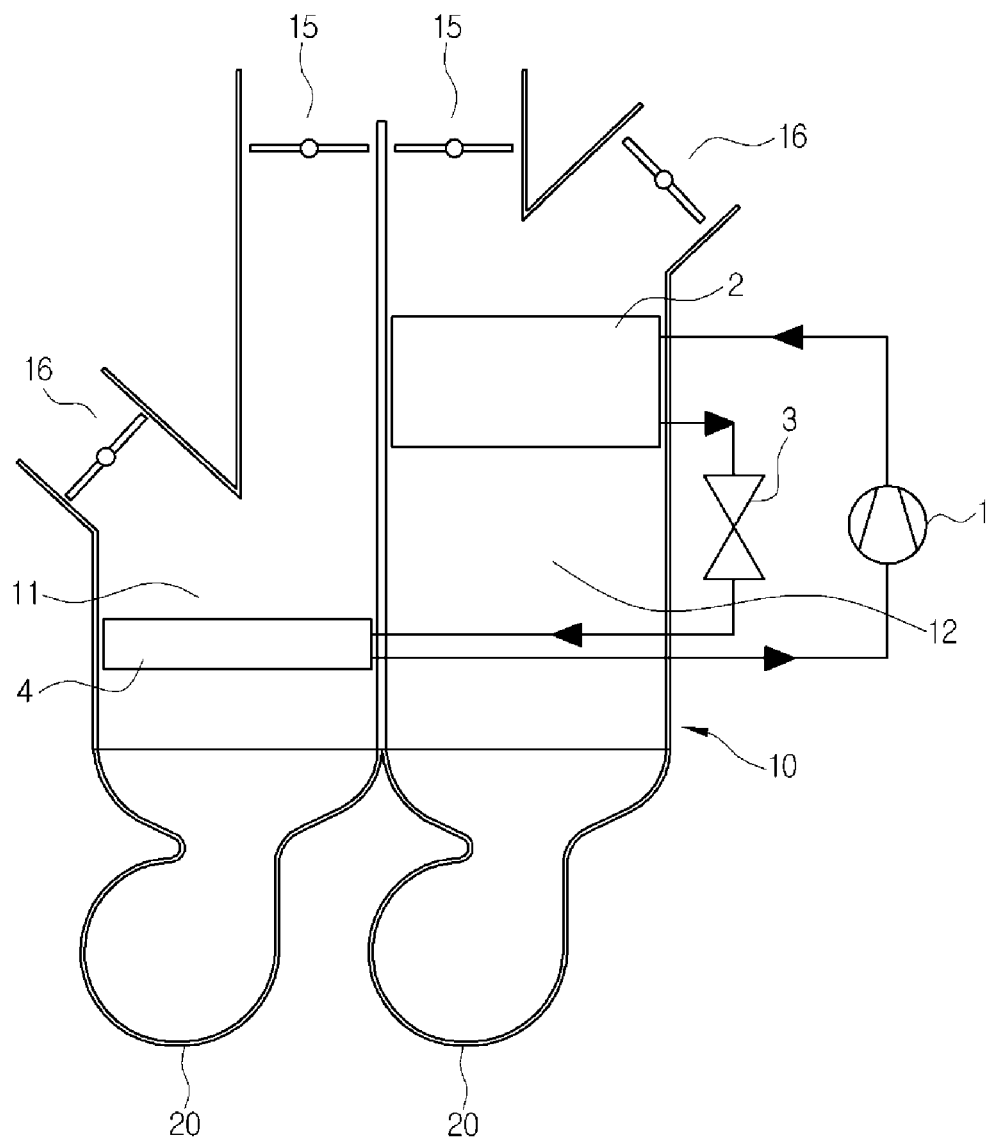
FIG. 2 is a view showing a conventional air conditioning system for a vehicle.

Reference will be now made in detail to preferred embodiments of the present invention with reference to the attached drawings.

As shown in the drawings, an air conditioning system for a vehicle according to the present invention includes a compressor (not shown), a condenser 102, expansion means (not shown) and an evaporator 104, which are connected with one another in order through a refrigerant circulation line (not shown), so as to carry out cooling through the evaporator 104 and carry out heating through the condenser 102.

First, the compressor inhales and compresses vapor-phase refrigerant of low-temperature and low-pressure discharged from the evaporator 104 while operating by receiving a driving force from a power supply, such as an engine or a motor, and then, discharges the refrigerant in a vapor phase of high-temperature and high-pressure.

The condenser 102 exchanges heat between the vapor-phase refrigerant of high-temperature and high-pressure, which is discharged from the compressor and flows inside the condenser 102, and air passing through the condenser 102, and in this instance, the refrigerant is condensed and the air is heated to be changed into warm air.

Such a condenser 102 may have a structure that the refrigerant circulation line (refrigerant pipe) is arranged in the form of a zigzag and a radiation fin (not shown) is mounted or a structure that a plurality of tubes (not shown) are stacked up and a radiation fin is mounted between the tubes.

Therefore, the vapor-phase refrigerant of high-temperature and high-pressure discharged from the compressor exchanges heat with the air to be condensed while flowing along the zigzag-shaped refrigerant circulation line or the tubes, and in this instance, the air passing through the condenser 102 is heated to be changed into warm air.

Moreover, the expansion means (not shown) rapidly expands liquid-phase refrigerant, which flows after being discharged from the condenser 102, by throttling effect and sends the expanded refrigerant in a saturated state of low-temperature and low-pressure to the evaporator 104. The expansion means may be an expansion valve or an orifice structure.

The evaporator 104 evaporates the liquid-phase refrigerant of low-pressure, which flows after being discharged from the expansion means, by exchanging heat between the liquid-phase refrigerant and the indoor air of the air-conditioning case 110 so as to cool the air due to a heat absorption by an evaporative latent heat of the refrigerant. Continuously, the vapor-phase refrigerant of low-temperature and low-pressure evaporated and discharged from the evaporator 104 is inhaled to the compressor again, and then, recirculates the above-mentioned cycle.

Furthermore, in the above-mentioned refrigerant circulation process, the air blown by a blower unit 130 is introduced into the air-conditioning case 110, is cooled by the evaporative latent heat of the liquid-phase refrigerant circulating inside the evaporator 104, and then, is discharged to the interior of the vehicle in a cooled state through a distribution duct 200, so that the interior of the vehicle is cooled.

The air blown by the blower unit 130 is introduced into the air-conditioning case 110, is heated by heat radiation of the vapor-phase refrigerant of high-temperature and high-pressure circulating inside the condenser 102 while passing through the condenser 102, and then, is discharged to the interior of the vehicle in a heated state through the distribution duct 200, so that the interior of the vehicle is cooled.

Additionally, the air conditioning system for the vehicle according to the present invention is configured by combination of the air-conditioning module 100 and the distribution duct 200.

The air-conditioning module 100 includes: an air-conditioning case 110 having a cold air passageway 111, on which the evaporator 104 is mounted, and a warm air passageway 112, on which the condenser 102 is mounted; and the blower unit 130 for blowing air to the cold air passageway 111 and the warm air passageway 112 of the air-conditioning case 110.

The distribution duct 200 includes mode doors 230 which are connected with an outlet 110b of the air-conditioning case 110 to distribute air discharged from the air-conditioning case 110 to a specific position of the interior of the vehicle according to air discharge modes.

Moreover, the air-conditioning module 100 and the distribution duct 200 are divided relative to a dash panel 300 which partitions the interior of the vehicle from an engine room. That is, the air-conditioning module 100 is arranged at the engine room side relative to the dash panel 300 and the distribution duct 200 is arranged at the interior side of the vehicle relative to the dash panel 300.

As described above, the air-conditioning module 100 including the air-conditioning case 110, in which the evaporator 104 and the condenser 102 are mounted, and the blower unit 130 is arranged at the engine room side relative to the dash panel 300, and the distribution duct 200 having the mode doors 230 for distributing air to the interior of the vehicle is arranged at the interior side of the vehicle relative to the dash panel 300 to be combined with each other, so that the air conditioning system for the vehicle can reduce noise and vibration in the interior of the vehicle because the air-conditioning module 100, which causes noise, is arranged at the engine room side and can secure an interior space of the vehicle to the maximum compared with the existing air conditioning systems because just the distribution duct 200 is arranged at the interior side of the vehicle.

In addition, the dash panel 300 has a through hole part 310, and as shown in the drawing, at least one through hole part 310 may be formed. Moreover, as shown in the drawing, the through hole part 310 may have a rectangular shape or one of various shapes.

Furthermore, the air-conditioning module 100 arranged in the engine room and the distribution duct 200 arranged at the interior of the vehicle are combined with each other through the through hole part 310. Namely, they are combined and connected with each other at the position of the through hole part 310.

In other words, the outlet 110b of the air-conditioning case 110 of the air-conditioning module 100 which penetrates through the through hole part 310 of the dash panel 300 is combined with an air inflow port 210 of the distribution duct 200, and in this instance, the air inflow port 210 of the distribution duct 200 is inserted into the outlet 110b of the air-conditioning case 110 to be combined.

Moreover, the cold and warm air passageways 111 and 112 of the air-conditioning case 110 may be arranged to be respectively put at the upper part and the lower part inside the air-conditioning case 110, and a division wall 113 is formed inside the air-conditioning case 110 to divide the cold air passageway 111 and the warm air passageway 112 from each other. That is, the cold and warm air passageways 111 and 112 may be respectively arranged at the upper part and the lower part by the division wall 113, which divides the inside of the air-conditioning case 110 into the upper part and the lower part.

Here, the structure of the cold and warm air passageways 111 and 112 which may be respectively arranged at the upper part and the lower part inside the air-conditioning case will be described. As shown in the drawings, the cold air passageway 111 may be arranged below the division wall 113, and the warm air passageway 112 may be arranged above the division wall 113, such that the cold air passageway 111 and warm air passageway 112 are stacked relative to one another inside the air-conditioning case 110. Of course, not shown in the drawings, the cold air passageway 111 may be arranged above the division wall 113, and the warm air passageway 112 may be arranged below the division wall 113.

In the meantime, the cold air passageway 111 and the warm air passageway 112 are formed in such a way as to be divided from each other at the inlet 110a of the air-conditioning case 110 by the division wall 113 and meet together at the outlet 110b of the air-conditioning case 110. That is, because the division wall 113 is not formed at the outlet 110b of the air-conditioning case 110, the cold air passageway 111 and the warm air passageway 112 are joined together.

Moreover, the evaporator 104 is mounted in the cold air passageway 111, and the condenser 102 is mounted in the warm air passageway 112. Additionally, due to the up-anddown arrangement structure of the warm air passageway 112 and the cold air passageway 111, the condenser 102 and the evaporator 104 are also arranged up and down. In other words, the condenser 102 and the evaporator 104 are arranged at right angles to the axial direction that rotary shafts of motors 133 and 137 of first and second blowers 130a and 130b, which will be described later, face.

Meanwhile, cold air flows toward the cold air passageway 111 in which the evaporator 104 is mounted, and warm air flows toward the warm air passageway 112 in which the condenser 102 is mounted.

Furthermore, a bypass passageway 114 is formed to penetrate the division wall 113 formed between the evaporator 104 and the condenser 102 to communicate the cold air passageway 111 and the warm air passageway 112 with each other, and a bypass door 115 is mounted on the bypass passageway 114 to open and close the bypass passageway 114.

The bypass passageway 114 bypasses some of the cold air passing through the evaporator 104 inside the cold air passageway 111 toward the warm air passageway 112, and the bypass door 115 closes the bypass passageway 114 in the cooling mode but selectively opens and closes the bypass passageway 114 in the heating mode.

Therefore, in a state where the bypass door 115 closes the bypass passageway 114, in the cooling mode, the cold air cooled by the evaporator 104 while flowing inside the cold air passageway 111 is supplied to the interior of the vehicle to carry out cooling, and the air flowing inside the warm air passageway 112 is released out. In the heating mode, the warm air heated by the condenser 102 while flowing inside the warm air passageway 112 is supplied to the interior of the vehicle to carry out heating, and in this instance, the air flowing inside the cold air passageway 111 is released out.

Furthermore, when dehumidification is needed during the heating mode, the bypass door 115 opens the bypass passageway 114. In this instance, some of the air cooled and dehumidified by the evaporator 104 while flowing inside the cold air passageway 111 is bypassed toward the warm air passageway 112 through the bypass passageway 114, and then, is supplied to the interior of the vehicle to carry out dehumidification and heating.

Additionally, the condenser 102 is mounted at the streamside lower than the bypass passageway 114. Therefore, the cold air cooled while passing through the evaporator 104 can be supplied to the condenser 102 through the bypass passageway 114.

In the meantime, the evaporator 104 is mounted at the streamside higher than the bypass passageway 114 in an air flow direction inside the cold air passageway 111.

In addition, at one side of the cold air passageway 111 of the air-conditioning case 110, disposed are a cold air discharge port 119a for discharging the cold air passing through the evaporator 104 to the outside and a cold air mode door 120 for opening and closing the cold air discharge port 119a and the cold air passageway 111. Moreover, at one side of the warm air passageway 112 of the air-conditioning case 110, disposed are a warm air discharge port 119b for discharging the warm air passing through the condenser 102 to the outside and a warm air mode door 121 for opening and closing the warm air discharge port 119b and the warm air passageway 112.

The cold air discharge port 119a and the cold air mode door 120 are disposed at the downstream side of the evaporator 104 in the cold air passageway 111, and the warm air discharge port 119b and the warm air mode door 121 are disposed at the downstream side of the condenser 102 in the warm air passageway 112. The air discharged through the cold air discharge port 119a and the warm air discharge port 119b is discharged to the outside of the vehicle through the engine room.

Therefore, in the cooling mode, the cold air mode door 120 opens the cold air passageway 111 and the warm air mode door 121 opens the warm air discharge port 119b, so that the air flowing through the cold air passageway 111 is cooled while passing through the evaporator 104. After that, the cooled air is discharged to the interior of the vehicle through the distribution duct 200 to cool the interior of the vehicle, and in this instance, the air flowing through the warm air passageway 112 is heated while passing through the condenser 102, and then, is discharged to the outside through the warm air discharge port 119b.

In the heating mode, the warm air mode door 121 opens the warm air passageway 112 and the cold air mode door 120 opens the cold air discharge port 119a, so that the air flowing through the warm air passageway 112 is heated while passing through the condenser 102. After that, the heated air is discharged to the interior of the vehicle through the distribution duct 200, and in this instance, the air flowing through the cold air passageway 111 is cooled while passing through the evaporator 104, and then, is discharged to the outside through the cold air discharge port 119a. Additionally, the air blower 130 is mounted at the inlet 110a of the air-conditioning case 110 to blow air toward the cold air passageway 111 and the warm air passageway 112.

The air blower 130 includes: a first blower 130a for blowing air toward the cold air passageway 111 through a discharge port 134 connected to the inlet 111a of the cold air passageway 111 of the air-conditioning case 110; and a second blower 130b for blowing air toward the warm air passageway 112 through a discharge port 138 connected to the inlet 112a of the warm air passageway 112 of the air-conditioning case 110.

The first blower 130a and the second blower 130b are arranged to be spaced apart from each other and opposed to each other in the width direction of the vehicle.

The first blower 130a includes: a scroll case 131 having the discharge port 134 to be connected to the inlet 111a of the cold air passageway 111 of the air-conditioning case 110; a blast fan 132 rotatably mounted inside the scroll case 131; an inlet ring 131a which is formed on one side of the scroll case 131 to introduce indoor air and outdoor air; and a motor 133 which is mounted on the other side of the scroll case 131 to rotate the blast fan 132.

The inlet ring 131a is formed on the one side of the scroll case 131 to which an intake duct 140 is located.

The second blower 130b includes: a scroll case 135 having the discharge port 138 to be connected to the inlet 112a of the warm air passageway 112 of the air-conditioning case 110; a blast fan 136 rotatably mounted inside the scroll case 135; an inlet ring 135a which is formed on one side of the scroll case 135 to introduce indoor air and outdoor air; and a motor 137 which is mounted on the other side of the scroll case 135 to rotate the blast fan 136.

The inlet ring 135a is formed on the one side of the scroll case 135 to which an intake duct 140 is located. The first blower 130a and the second blower 130b are mounted in such a way that rotary shafts of the motors 133 and 137 are in the same direction. Furthermore, the inlet ring 131a of the first blower 130a and the inlet ring 135a of the second blower 130b are formed to be opposed to each other.

Meanwhile, the scroll cases 131 and 135 of the first and second blowers 130a and 130b are formed in a scroll type around the blast fans 132 and 136 mounted inside the blowers 130*a* and 130*b*. Therefore, cross section areas of air passageways around the blast fans 132 and 136 inside the scroll cases 131 and 135 get gradually larger from a start point to an end point of a scroll.

Moreover, the discharge ports 134 and 138 of the first and second blowers 130*a* and 130*b* respectively extend from the end points of the scroll of the scroll cases 131 and 135 and are respectively connected with the cold air passageway 111 and the warm air passageway 112.

In the meantime, the scroll case 131 of the first blower 130*a* and the scroll case 135 of the second blower 130*b* are mounted to have scroll directions opposed to each other, such that the scroll case 131 of the first blower 130*a* is connected with the cold air passageway 111 located below the division wall 113 and the scroll case 135 of the second blower 130*b* is connected with the warm air passageway 112 located above the division wall 113.

Furthermore, an intake duct 140 which is connected with the first and second blowers 130*a* and 130*b* to be communicated with each other is mounted between the first blower 130*a* and the second blower 130*b* so as to supply indoor air and outdoor air to the first and second blowers 130*a* and 130*b*.

That is, one intake duct 140 is mounted between the first blower 130*a* and the second blower 130*b*, such that the first and second blowers 130*a* and 130*b* can commonly use the one intake duct 140.

As described above, because the intake duct 140 is mounted between the first blower 130*a* and the second blower 130*b*, the system using the two blowers 130*a* and 130*b* which are operated individually uses just one intake duct 140 so as to maximize space efficiency and reduce the size and manufacturing costs of the system.

The intake duct 140 includes: an outdoor air inlet 141 for introducing outdoor air; an indoor air inlet 142 for introducing indoor air; a first indoor and outdoor air converting door 147 which is mounted to open and close a passageway for communicating the indoor air inlet 142, the outdoor air inlet 141 and the first blower 130*a* to selectively introduce indoor air and outdoor air toward the first blower 130*a*; and a second indoor and outdoor air converting door 148 which is mounted to open and close a passageway for communicating the indoor air inlet 142, the outdoor air inlet 141 and the second blower 130*b* to selectively introduce indoor air and outdoor air toward the second blower 130*b*.

In other words, the first indoor and outdoor air converting door 147 is mounted at the upstream side of the inlet ring 131*a* of the first blower 130*a* between the outdoor air inlet 141 and the indoor air inlet 142 in order to selectively open and close a passageway for communicating the inlet ring 131*a* and the outdoor air inlet 141 with each other and a passageway for communicating the inlet ring 131*a* and the indoor air inlet 142 with each other.

The second indoor and outdoor air converting door 148 is mounted at the upstream side of the inlet ring 135*a* of the second blower 130*b* between the outdoor air inlet 141 and the indoor air inlet 142 in order to selectively open and close a passageway for communicating the inlet ring 135*a* and the outdoor air inlet 141 with each other and a passageway for communicating the inlet ring 135*a* and the indoor air inlet 142 with each other.

Meanwhile, it is preferable that the outdoor air inlet 141 be formed at an upper part of the intake duct 140 and the indoor air inlet 142 be formed at a lower part of the intake duct 140, but positions of the outdoor air inlet 141 and the indoor air inlet 142 may be varied. The first indoor and outdoor air converting door 147 and the second indoor and outdoor air converting door 148 are dome-shaped doors.

As described above, one intake duct 140 is mounted between the first blower 130*a* and second blower 130*b* and the first and second indoor and outdoor air converting doors 147 and 148 are mounted inside the intake duct 140, such that indoor air and outdoor air introduced into the indoor air inlet 142 and the outdoor air inlet 141 of the intake duct 140 can be selectively supplied to the first and second blowers 130*a* and 130*b*.

In the meantime, air filters (not shown) are respectively mounted on the outdoor air inlet 141 and the indoor air inlet 142 so as to remove impurities contained in the air introduced into the outdoor air inlet 141 and the indoor air inlet 142.

Furthermore, the outdoor air inlet 141 of the intake duct 140 communicates with the outside of the vehicle, and the indoor air inlet 142 of the intake duct 140 communicates with the interior of the vehicle. In this instance, an indoor air inflow duct 143 which connects the indoor air inlet 142 of the blower unit 130 with the interior of the vehicle is mounted on the outer face of the air-conditioning case 110.

That is, the indoor air inflow duct 143 is mounted on the outer face of the air-conditioning case 110 to connect the indoor air inlet 142 of the intake duct 140 with the interior of the vehicle, and in this instance, an inlet 143*a* of the indoor air inflow duct 143 penetrates through the dash panel 300 and is connected with the interior of the vehicle. In this instance, the outlet 110*b* of the air-conditioning case 110 and the inlet 143*a* of the indoor air inflow duct 143 are arranged side by side to penetrate the through hole part 310.

The inlet 143*a* of the indoor air inflow duct 143 and the outlet 110*b* of the air-conditioning case 110 are arranged side by side to penetrate through the through hole part 310, such that just one through hole part 310 is formed in the dash panel 300 for installation of the air conditioning system.

Moreover, the distribution duct 200 includes an air inflow port 210 connected with the outlet 110*b* of the air-conditioning case 110, a plurality of air outflow ports 220 for distributing air introduced into the air inflow port 210 to specific positions of the interior of the vehicle, and the mode doors 230 for controlling the degree of opening of the air outflow ports 220.

The air outflow ports 220 are a defrost vent 221 and a face vent 222 which are partitioned from each other at an upper part of the distribution duct 200, and a floor vent 223 which is formed to be adjacent to the dash panel 300.

Figure 3:
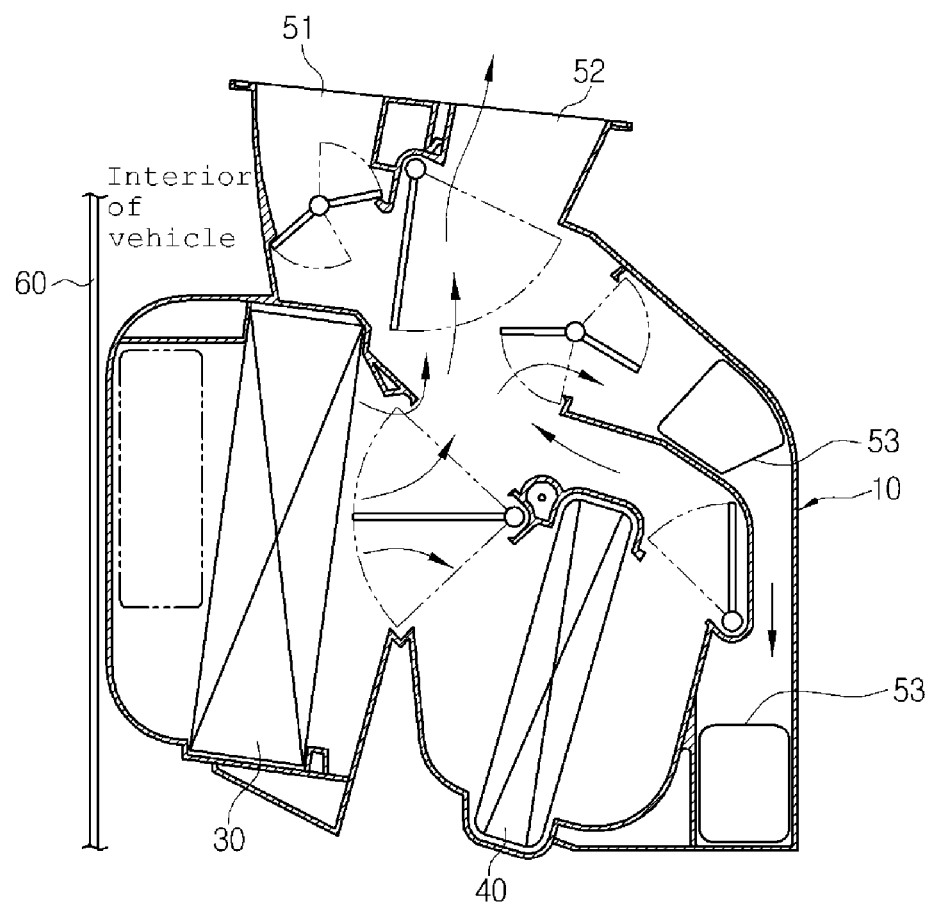
FIG. 3 is a sectional view showing an example of a conventional air-conditioning case mounted in the interior of the vehicle.
Figure 4:
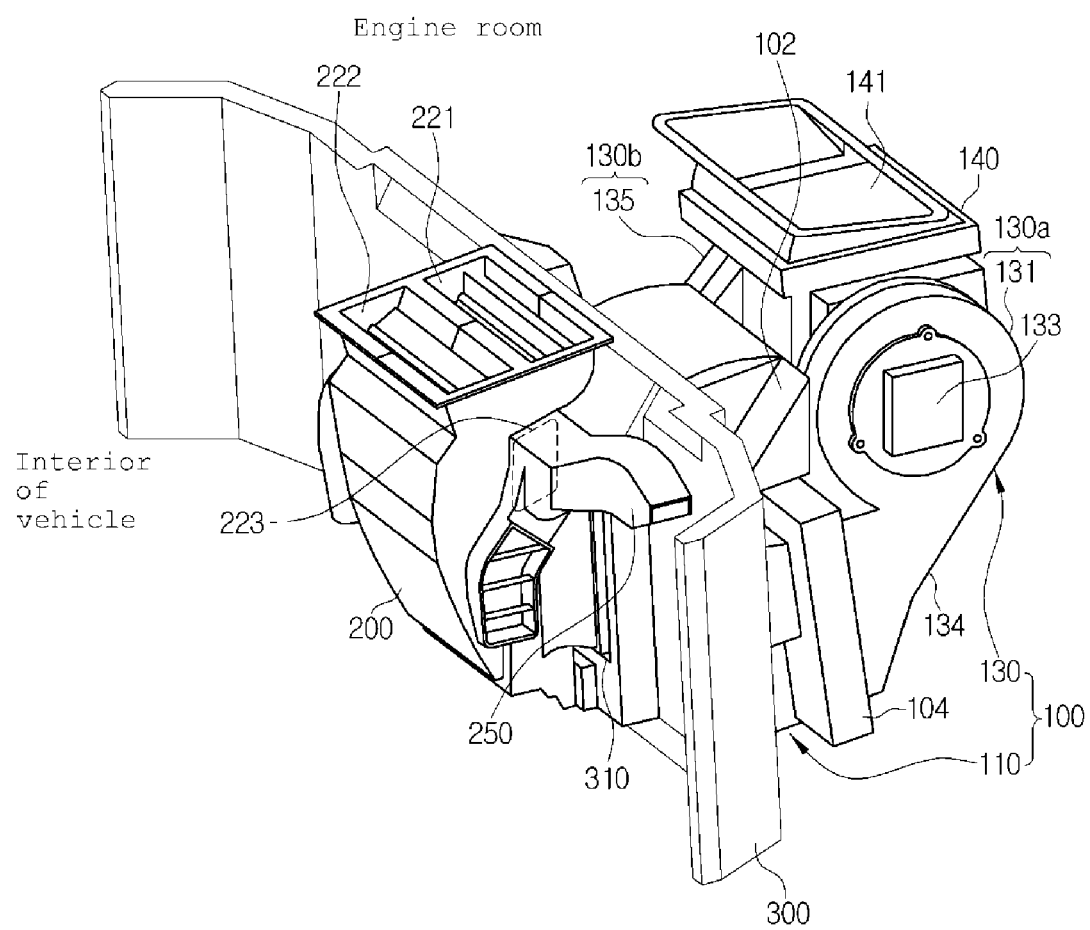
FIG. 4 is a perspective view showing an air conditioning system for a vehicle according to a preferred embodiment of the present invention.
Figure 5:
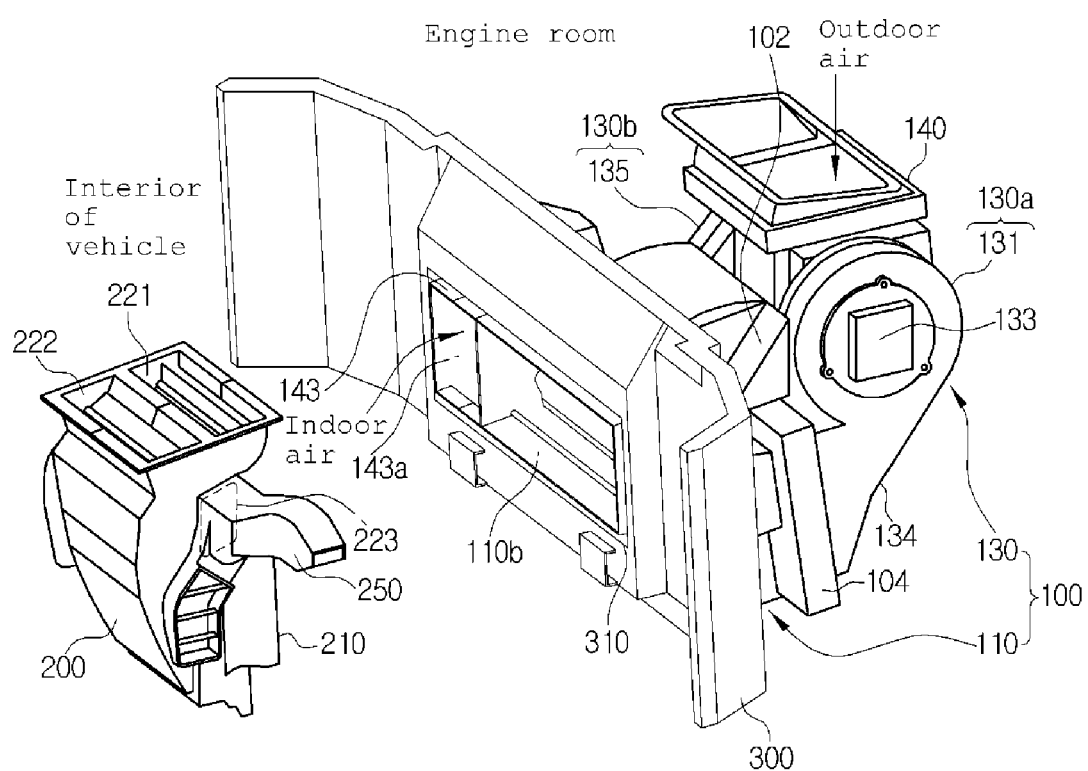
FIG. 5 is a perspective view showing a state where a distribution duct in FIG. 4 is separated.
Figure 6:
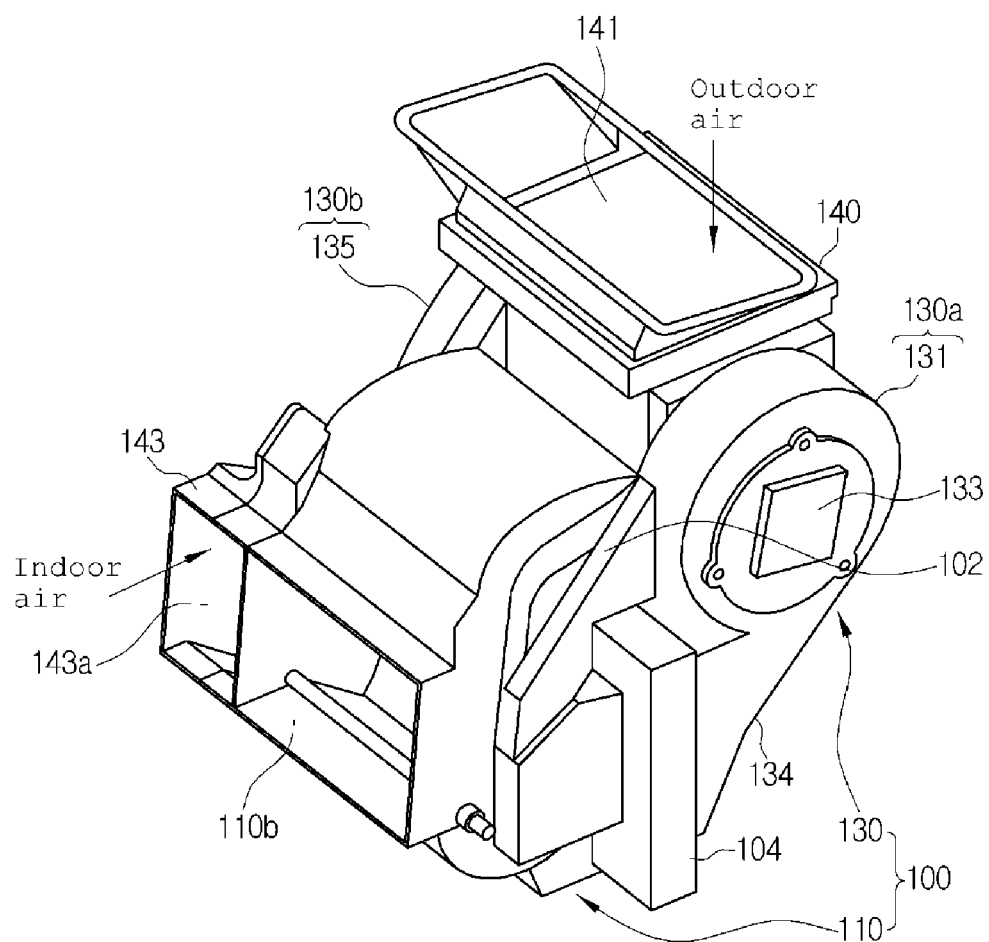
FIG. 6 is a perspective view showing an air-conditioning module of the air conditioning system for the vehicle according to the present invention.
Figure 7:
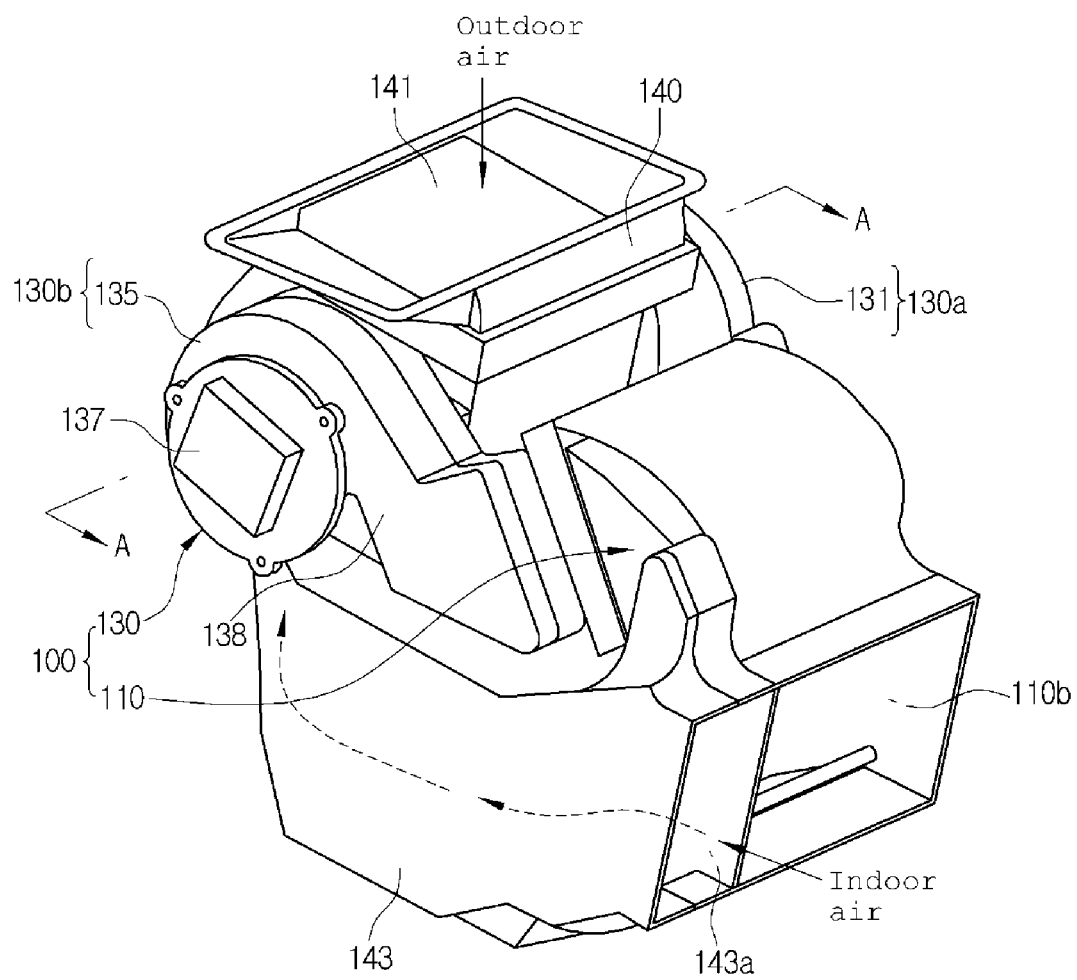
FIG. 7 is a perspective view viewed from an indoor air inflow duct of FIG. 6.
Figure 8:
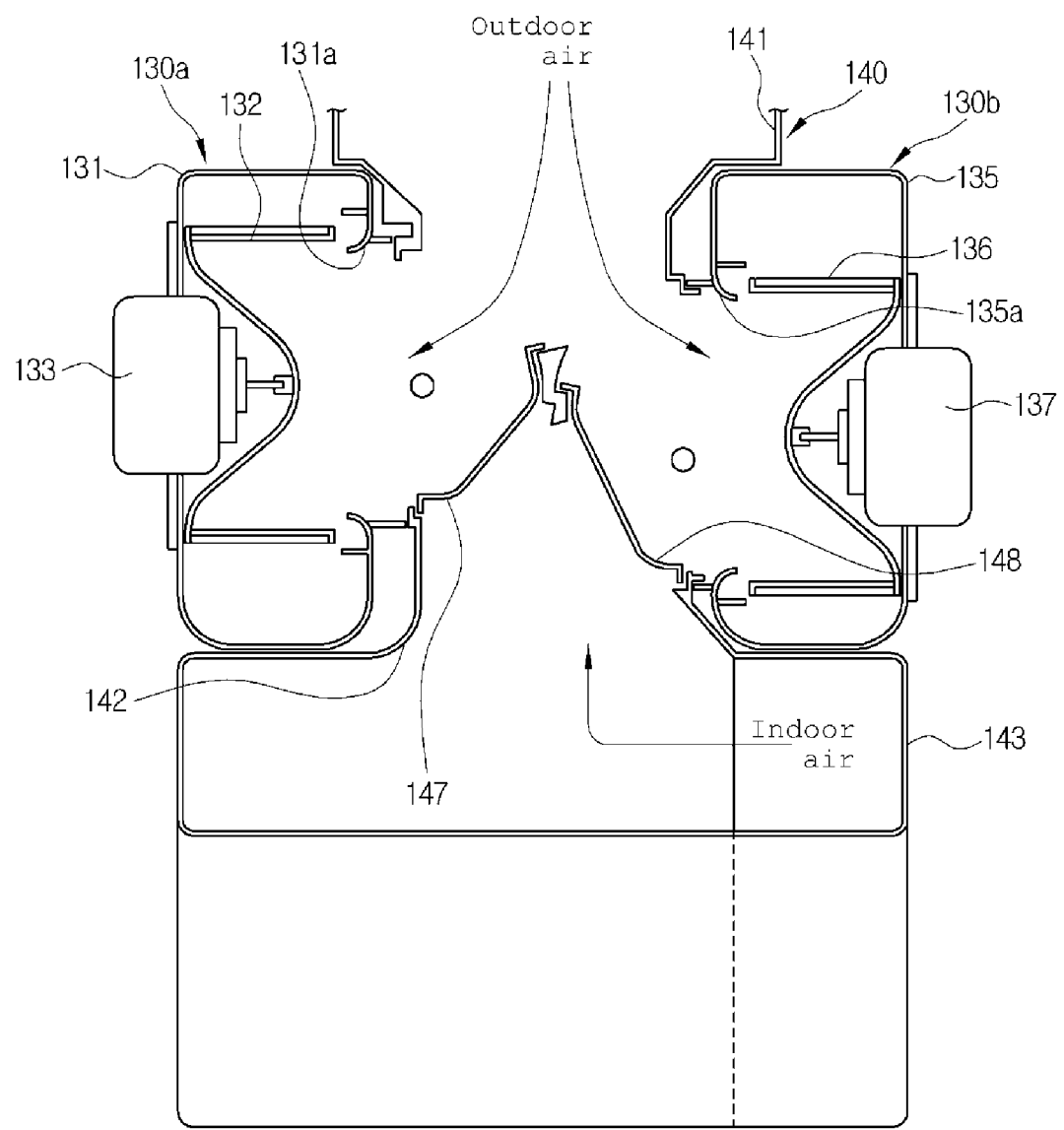
FIG. 8 is a sectional view taken along the line A-A of FIG. 7.

In this instance, for a passenger's comfort in the interior of the vehicle, the floor vent 223 discharges air which is warmer than that of the face vent 222, and the face vent 222 or the defrost vent 221 discharges air which is colder than that of the floor vent 223. Because warm air flows above the division wall 113 and cold air flows below the division wall 113 inside the air-conditioning case 110, if the floor vent is arranged in the air-conditioning case to be far from the dash panel as shown in FIG. 3, the cold air passing through the evaporator 104 is mostly discharged toward the floor vent, and the warm air passing through condenser 102 is mostly discharged toward the face vent so as to cause a reversal phenomenon between high and low temperatures.

Therefore, in the present invention, the floor vent 223 is formed at one side of an area where relatively lots of warm air flows in a mixing chamber MC, in which cold air and warm air in the distribution duct 200 are mixed together.

That is, warm air is introduced to the upper part and cold air is introduced to the lower part through the air inflow port 210 of the distribution duct 200, and then, the introduced cold air and warm air are mixed together in the mixing chamber MC of the distribution duct 200. However, still, relatively lots of warm air flows to an upper zone and relatively lots of cold air flows to a lower zone in the mixing chamber MC.

Therefore, the floor vent 223 is formed at one side of the area, in which a relatively large amount of hot air flows, out of the mixing chamber MC of the distribution duct 200, i.e., a side adjacent to the dash panel in the distribution duct 200, such that warmer air is discharged through the floor vent 223 and colder air is discharged through the face vent 222 to enhance comfortability in the interior of the vehicle and prevent the reversal phenomenon between high and low temperatures.

Figure 11:
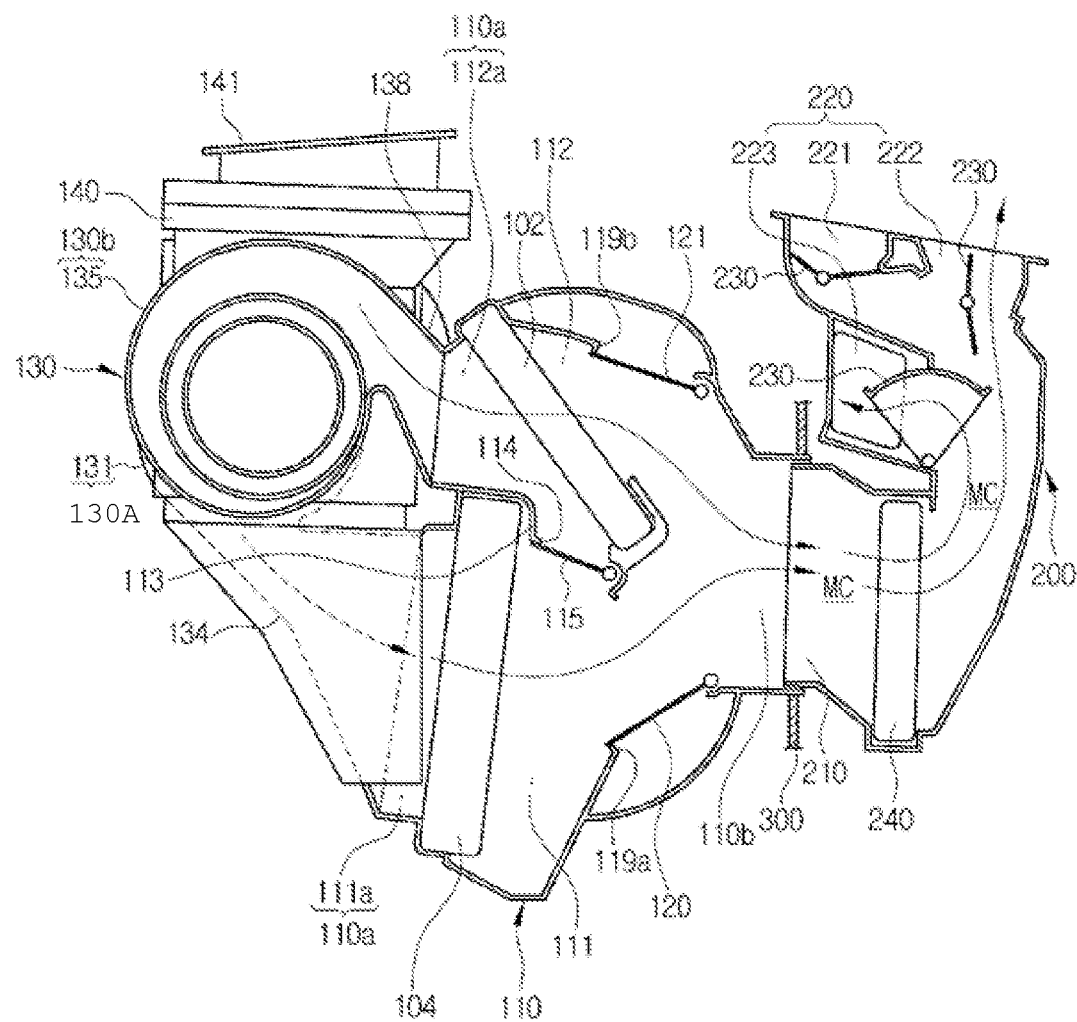
FIG. 11 is a sectional view showing a mixing mode of the air conditioning system for the vehicle according to the present invention.

Referring to FIG. 11, the warm air flowing along the warm air passageway 112 disposed at the upper part inside the air-conditioning case 110 and the cold air flowing along the cold air passageway 111 disposed at the lower part inside the air-conditioning case 110 are introduced into the distribution duct 200, and then, are mixed together in the mixing chamber MC. However, considering the flow of air, warmer air is discharged through the floor vent 223, which is near to the area where the relatively large amount of warm air flows, and colder air is discharged through the face vent 222, which is near to the area where the relatively large amount of cold air flows.

Meanwhile, the floor vent 223 is formed at the position corresponding to the warm air passageway 112, namely, is formed at the side of the distribution duct 200 located at the position corresponding to the warm air passageway 112.

Furthermore, the floor vent 223, which is formed adjacent to the dash panel 300 in the distribution duct 200, is formed between the air inflow port 210 and the defrost vent 221 of the distribution duct 200.

In the meantime, a shower duct 250 is connected with the floor vent 223 and is mounted on the outer surface of the distribution duct 200 to guide the air discharged through the floor vent 223 to the passenger's feet.

As described above, the air conditioning system according to the present invention can reduce the size of the distribution duct 200 and secure the maximized space of the interior of the vehicle because only the distribution duct 200 is arranged in the interior of the vehicle relative to the dash panel 300 and due to the arrangement structure of the floor vent 223.

Meanwhile, the defrost vent 221 discharges air toward the front window of the interior of the vehicle, the face vent 222 discharges air toward the face of the passenger who is sitting on the front seat of the vehicle, and the floor vent 223 discharges air toward the passenger's feet.

Furthermore, the mode doors 230 mounted in the distribution duct 200 are respectively mounted at the defrost vent 221, the face vent 222 and the floor vent 223 to control the degrees of opening of the vents according to the air discharge modes. In this instance, the mode door 230 for opening and closing the floor vent 223 is a dome-shaped door and is mounted to face the dash panel 300. Of course, the mode door 230 may adopt one of other doors of various types. Meanwhile, an electric heater 240 may be mounted inside the distribution duct 200.

Hereinafter, a refrigerant flowing process of the air conditioning system for the vehicle according to the present invention will be described.

First, the vapor-phase refrigerant of high-temperature and high-pressure discharged after being compressed in the compressor is introduced into the condenser 102. The vapor-phase refrigerant introduced into the condenser 102 exchanges heat with the air passing through the condenser 102, and in the above process, the refrigerant is liquefied while being cooled. The liquid-phase refrigerant discharged from the condenser 102 is introduced into the expansion means to be decompressed and expanded.

The refrigerant decompressed and expanded in the expansion means becomes an atomized state of low-temperature and low-pressure and is introduced into the evaporator 104. The refrigerant introduced into the evaporator 104 exchanges heat with the air passing through the evaporator 104 to be evaporated. After that, the refrigerant of low-temperature and low-pressure discharged from the evaporator 104 is introduced into the compressor, and then, recirculates the above-mentioned refrigeration cycle.

Hereinafter, air flow processes in the cooling mode, in the heating mode and in the mixing mode will be described.

A. Cooling Mode

Figure 9:
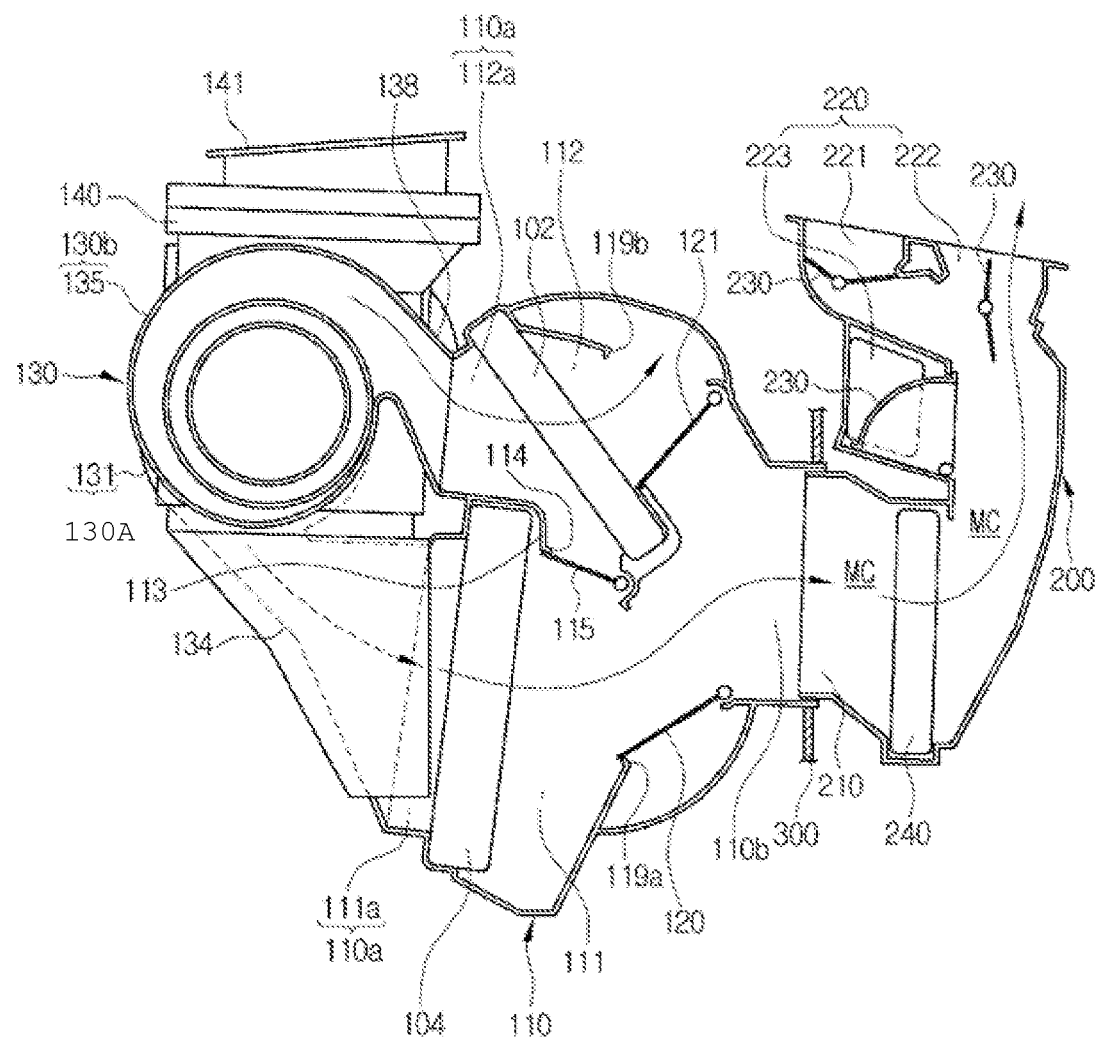
FIG. 9 is a sectional view showing a cooling mode of the air conditioning system for the vehicle according to the present invention.

In the cooling mode, as shown in FIG. 9, the cold air mode door 120 is operated to open the cold air passageway 111, and the warm air mode door 121 is operated to open the warm air discharge port 119*b*. Additionally, the first and second indoor and outdoor air converting doors 147 and 148 are operated according to the indoor air inflow mode or the outdoor air inflow mode to selectively supply indoor air or outdoor air toward the first and second blowers 130*a* and 130*b*.

Therefore, when the first and second blowers 130*a* and 130*b* are operated, the indoor air introduced into the intake duct 140 is inhaled to the first blower 130*a* and is supplied to the cold air passageway 111, and the outdoor air introduced into the intake duct 140 is inhaled to the second blower 130*b* and is supplied to the warm air passageway 112.

The air supplied to the cold air passageway 111 is cooled while passing through the evaporator 104, and then, flows to the distribution duct 200. After that, the air is discharged to the interior of the vehicle through the air outflow port 220 by the mode door 230 according to the air discharge mode in order to carry out cooling. In this instance, the air supplied to the warm air passageway 112 is heated while passing through the condenser 102, and then, is discharged to the exterior of the vehicle.

B. Heating Mode

Figure 10:
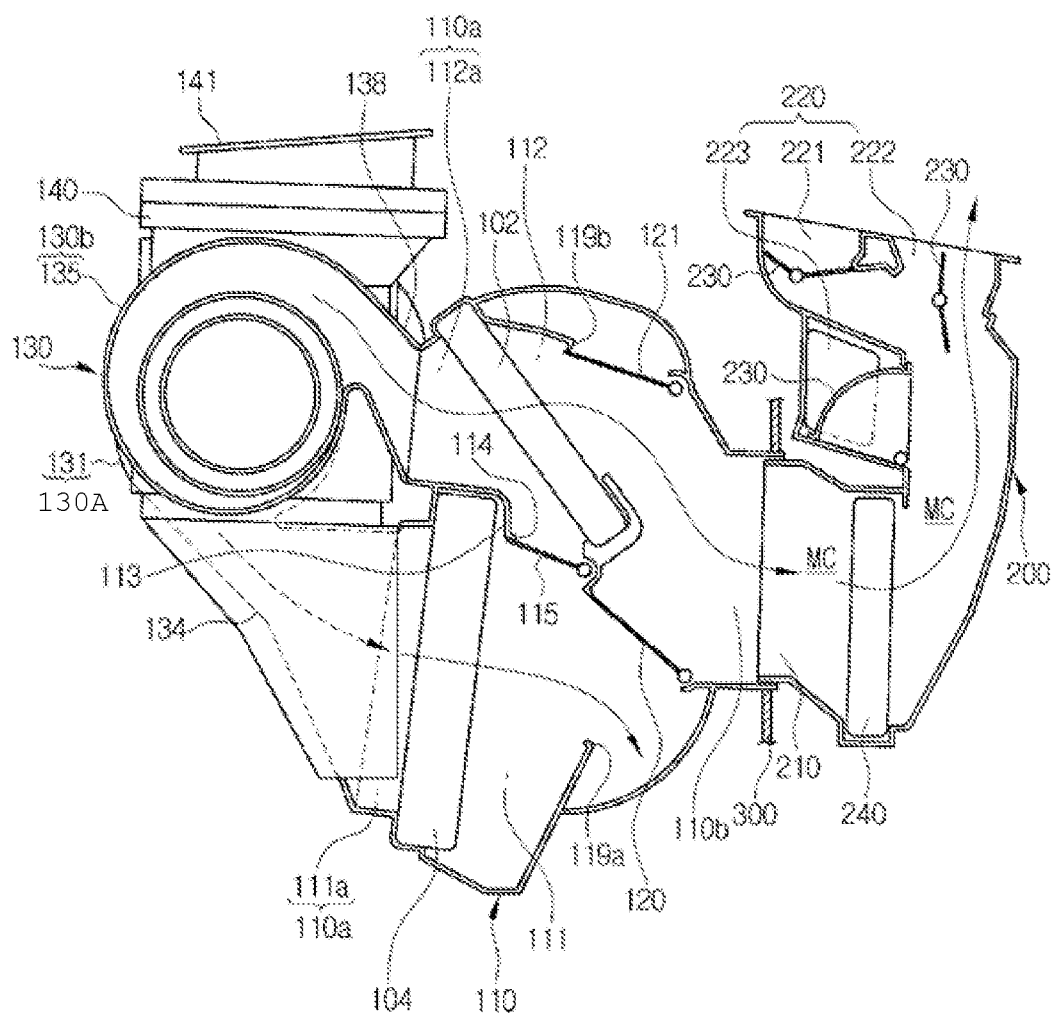
FIG. 10 is a sectional view showing a heating mode of the air conditioning system for the vehicle according to the present invention.

In the heating mode, as shown in FIG. 10, the warm air mode door 121 is operated to open the warm air passageway 112, and the cold air mode door 120 is operated to open the cold air discharge port 119*a*. Additionally, the first and second indoor and outdoor air converting doors 147 and 148 are operated according to the indoor air inflow mode or the outdoor air inflow mode to selectively supply indoor air or outdoor air toward the first and second blowers 130*a* and 130*b*.

Therefore, when the first and second blowers 130*a* and 130*b* are operated, the indoor air introduced into the intake duct 140 is inhaled to the first blower 130*a* and is supplied to the cold air passageway 111, and the outdoor air introduced into the intake duct 140 is inhaled to the second blower 130*b* and is supplied to the warm air passageway 112.

The air supplied to the warm air passageway 112 is heated while passing through the condenser 102, and then, flows to the distribution duct 200. After that, the air is discharged to the interior of the vehicle through the air outflow port 220 by the mode door 230 according to the air discharge mode in order to carry out heating. In this instance, the air supplied to the cold air passageway 111 is cooled while passing through the evaporator 104, and then, is discharged to the exterior of the vehicle through the cold air discharge port 119a.

C. Mixing Mode

In the mixing mode, as shown in FIG. 11, the cold air mode door 120 is operated to open the cold air passageway 111, and the warm air mode door 121 is operated to open the warm air passageway 112. Additionally, the first and second indoor and outdoor air converting doors 147 and 148 are operated according to the indoor air inflow mode or the outdoor air inflow mode to selectively supply indoor air or outdoor air toward the first and second blowers 130a and 130b.

Therefore, when the first and second blowers 130a and 130b are operated, the indoor air introduced into the intake duct 140 is inhaled to the first blower 130a and is supplied to the cold air passageway 111, and the outdoor air introduced into the intake duct 140 is inhaled to the second blower 130b and is supplied to the warm air passageway 112.

The air supplied to the cold air passageway 111 is cooled while passing through the evaporator 104, and then, flows to the distribution duct 200. The air supplied to the warm air passageway 112 is heated while passing through the condenser 102, and flows to the distribution duct 200. Continuously, the cold air and the warm air flowing to the distribution duct 200 are mixed together in the mixing chamber MC, and then, are discharged to the interior of the vehicle through the air outflow port 220 opened by the mode door 230 according to the air discharge mode.

As shown in the drawings, after the cold air and the warm air are mixed together in the mixing chamber MC, the relatively large amount of the warm air is discharged through the floor vent 223 and the relatively large amount of the cold air is discharged through the face vent 222.

Figure 12:
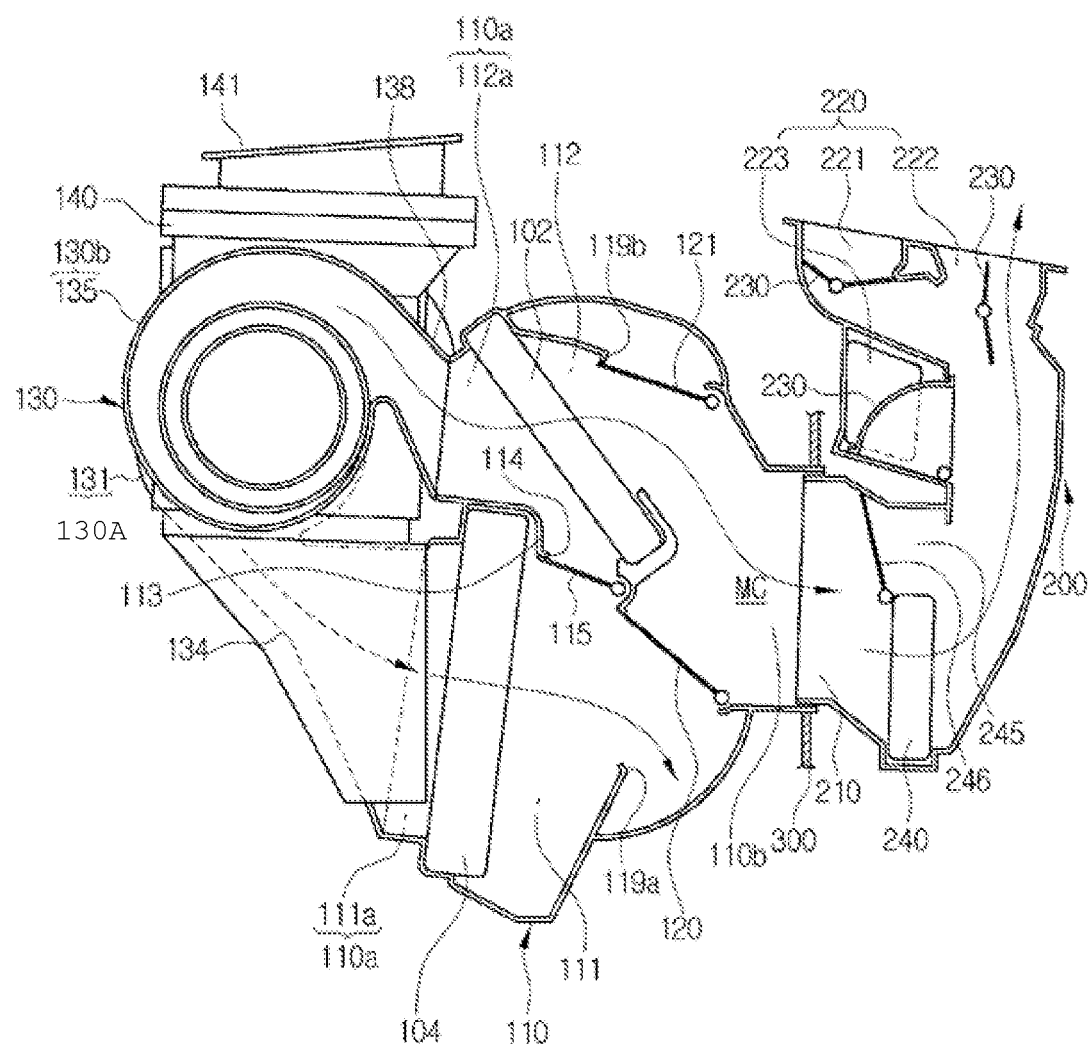
FIG. 12 is a perspective view showing an air conditioning system for a vehicle according to another embodiment of the present invention.

In the meantime, FIG. 12 is a sectional view showing an air conditioning system according to another embodiment of the present invention. In comparison with the previous embodiment of the present invention, just different parts of this embodiment will be described.

Referring to FIG. 12, the air conditioning system according to this embodiment has an air mixing part MC, which is formed inside the air-conditioning case 110 to be located at the front end of the through hole part 310 of the dash panel 300, such that cold air passing through the cold air passageway 111 and warm air passing through the warm air passageway 112 are mixed together. The air mixing part MC is formed at the outlet 110b of the air-conditioning case 110 where the cold air passageway 111 and the warm air passageway 112 meet together.

As described above, the air conditioning system can secure a sufficient mixing performance because the cold air and the warm air are mixed from the front end of the through hole part 310 of the dash panel 300, namely, at the side of the engine room.

Moreover, the electric heater 240 is mounted inside the distribution duct 200 arranged in the interior of the vehicle. The electric heater 240 is selectively operated, for instance, only when heating performance is poor.

Furthermore, the distribution duct 200 includes: a bypass passageway 245 formed such that the air flowing inside the distribution duct 200 bypasses the electric heater 240; and a bypass door 246 for controlling the degree of opening of the bypass passageway 245 and a passageway of the side of the electric heater 240.

Therefore, when the electric heater 240 is operated, as shown in FIG. 12, the bypass passageway 245 is closed by the bypass door 246 such that the air passes through the electric heater 240. When the electric heater 240 is not operated, the passageway of the side of the electric heater 240 is closed by the bypass door 246 such that the air bypasses the electric heater 240. So, the air conditioning system can reduce a flow resistance of air.

The invention claimed is:

1. An air conditioning system for a vehicle comprising:
an air-conditioning case having a cold air passageway and a warm air passageway;
a distribution duct, which is connected with an outlet of the air-conditioning case and includes a defrost vent, a face vent, and a floor vent disposed to distribute cold air and warm air discharged from the air-conditioning case to a specific position of an interior of the vehicle according to air discharge modes;
a dash panel separating an engine room from the interior of the vehicle;
the air-conditioning case arranged inside the engine room relative to the dash panel, and the distribution duct arranged in the interior of the vehicle relative to the dash panel;
one through hole defined in the dash panel, and the air-conditioning case and the distribution duct being combined with each other through the one through hole;
a division wall partitioning the cold air passageway and the warm air passageway such that the cold air passageway and warm air passageway are stacked relative to one another inside the air-conditioning case;
a condenser positioned in the warm air passageway and extending between the division wall and a top wall of the air-conditioning case, and an evaporator positioned in the cold air passageway below the division wall and extending between the division wall and a bottom wall of the air-conditioning case;
the division wall partitioning the warm and cold air passageways at an inlet of the air-conditioning case, the warm and cold air passageways meeting together at the outlet of the air-conditioning case, such that an air mixing part where cold air from the cold air passageway and warm air from the warm air passageway meet is formed adjacent to the outlet of the air-conditioning case;
wherein the floor vent is located closer to the warm air passageway than the cold air passageway such that warmer air is discharged through the floor vent than through the face vent;
the air-conditioning case defining a cold air discharge port at one side of the cold air passageway of the air-conditioning case for discharging cold air passing through the evaporator to an outside;
a cold air mode door for opening and closing the cold air discharge port;
the air-conditioning case defining a warm air discharge port at one side of the warm air passageway of the air-conditioning case for discharging warm air passing through the condenser to the outside;
a warm air mode door for opening and closing the warm air discharge port;
the division wall defining a bypass passageway between the evaporator and the condenser for fluidly communicating the cold air passageway with the warm air passageway;
a bypass door mounted on the bypass passageway for opening and closing the bypass passageway;

wherein a blower unit for blowing air to the cold air passageway and the warm air passageway is connected to the air-conditioning case;

wherein the blower unit includes a first blower connected to a side of an inlet of the cold air passageway of the air-conditioning case to blow air toward the cold air passageway, and a second blower connected to a side of an inlet of the warm air passageway of the air-conditioning case to blow air toward the warm air passageway;

wherein the first and second blowers are spaced apart and opposed to each other in a width direction of the vehicle, and wherein an entire inlet of an intake duct is located between the first and second blowers in the width direction.

2. The air conditioning system according to claim 1, wherein the floor vent is formed adjacent to the dash panel in the distribution duct.

3. The air conditioning system according to claim 2, wherein the defrost vent and the face vent are partitioned from each other at an upper part of the distribution duct, and
  wherein the floor vent is formed between an air inflow port of the distribution duct and the defrost vent.

4. The air conditioning system according to claim 2, wherein a mode door for opening and closing the floor vent is mounted in the distribution duct, and is mounted to face the dash panel.

5. The air conditioning system according to claim 1, wherein the floor vent is formed at a side of the distribution duct.

6. The air conditioning system according to claim 1, wherein an electric heater is mounted inside the distribution duct arranged in the interior of the vehicle.

7. The air conditioning system according to claim 6, wherein the distribution duct comprises: a bypass passageway formed such that the air flowing inside the distribution duct bypasses the electric heater; and a bypass door for controlling a degree of opening of the bypass passageway and a passageway of a side of the electric heater.

8. The air conditioning system according to claim 1, wherein the one through hole is formed in the dash panel, and the air-conditioning case and the distribution duct are combined with each other through the one through hole, and
  wherein the air mixing part where cold air passing through the cold air passageway and warm air passing through the warm air passageway are mixed together is formed inside the air-conditioning case to be located at a front end of the one through hole.

9. An air conditioning system for a vehicle comprising:
  an air-conditioning case having a cold air passageway and a warm air passageway;
  a distribution duct, which is connected with an outlet of the air-conditioning case and includes a defrost vent, a face vent, and a floor vent disposed to distribute cold air and warm air discharged from the air-conditioning case to a specific position of an interior of the vehicle according to air discharge modes;
  wherein the floor vent is placed on one side of an area, in which a relatively large amount of warm air flows, in a mixing chamber of the distribution duct where cold air and warm air are mixed;
  wherein a dash panel separates an engine room from the interior of the vehicle;
  wherein the air-conditioning case is arranged inside the engine room relative to the dash panel, and the distribution duct is arranged in the interior of the vehicle relative to the dash panel;
  wherein one through hole is defined in the dash panel, and the air-conditioning case and the distribution duct are combined with each other through the one through hole;
  wherein a blower unit for blowing air to the cold air passageway and the warm air passageway is connected to the air-conditioning case;
  wherein the blower unit includes a first blower connected to a side of an inlet of the cold air passageway of the air-conditioning case to blow air toward the cold air passageway, and a second blower connected to a side of an inlet of the warm air passageway of the air-conditioning case to blow air toward the warm air passageway;
  wherein the first and second blowers are spaced apart and opposed to each other in a width direction, and wherein an inlet of an intake duct is located between the first and second blowers in the width direction and in a length direction being perpendicular to the width direction;
  a division wall partitioning the cold air passageway and the warm air passageway such that the cold air passageway and warm air passageway are stacked relative to one another inside the air-conditioning case;
  a condenser positioned in the warm air passageway and extending between the division wall and a top wall of the air-conditioning case, and an evaporator positioned in the cold air passageway below the division wall and extending between the division wall and a bottom wall of the air-conditioning case;
  the division wall partitioning the warm and cold air passageways at an inlet of the air-conditioning case, the warm and cold air passageways meeting together at the outlet of the air-conditioning case, such that the mixing chamber where cold air from the cold air passageway and warm air from the warm air passageway meet is formed adjacent to the outlet of the air-conditioning case;
  wherein the floor vent is located closer to the warm air passageway than the cold air passageway such that warmer air is discharged through the floor vent than through the face vent;
  the air-conditioning case defining a cold air discharge port at one side of the cold air passageway of the air-conditioning case for discharging cold air passing through the evaporator to an outside;
  a cold air mode door for opening and closing the cold air discharge port;
  the air-conditioning case defining a warm air discharge port at one side of the warm air passageway of the air-conditioning case for discharging warm air passing through the condenser to the outside;
  a warm air mode door for opening and closing the warm air discharge port;
  the division wall defining a bypass passageway between the evaporator and the condenser for fluidly communicating the cold air passageway with the warm air passageway;
  a bypass door mounted on the bypass passageway for opening and closing the bypass passageway.

* * * * *